J. Tanner,

Gate.

No. 86,603.

Patented Feb. 2, 1869.

Witnesses:
L. C. Conner
Benjamin Zueck

Inventor:
Jacob Tanner

JACOB TANNER, OF HEBRON, KENTUCKY.

Letters Patent No. 86,603, dated February 2, 1869.

IMPROVEMENT IN FARM-GATES.

The Schedule referred to in these Letters Patent and making part of the same.

*To all whom it may concern:*

Be it known that I, JACOB TANNER, of Hebron, in the county of Boone, and State of Kentucky, have invented a new and useful Improvement in Farm-Gates; and I do hereby declare the following to be a full, clear, and exact description of the same, reference being had to the accompanying drawings, which, with the letters of reference marked thereon, form part of this specification.

My invention relates to the construction of the gate by which the outer or free end may be readily elevated or lowered, relatively to the inner or pivoted end, without interfering with or disturbing the latter.

The outer end of the gate may thus be elevated and supported, and made to rotate above and free from accumulations of ice, snow, and other obstructions to its movement, and when these no longer remain, the free end of the gate may be lowered, and made to rotate and close with an appropriate proximity to the ground.

In the accompanying drawings—

Figure 1:
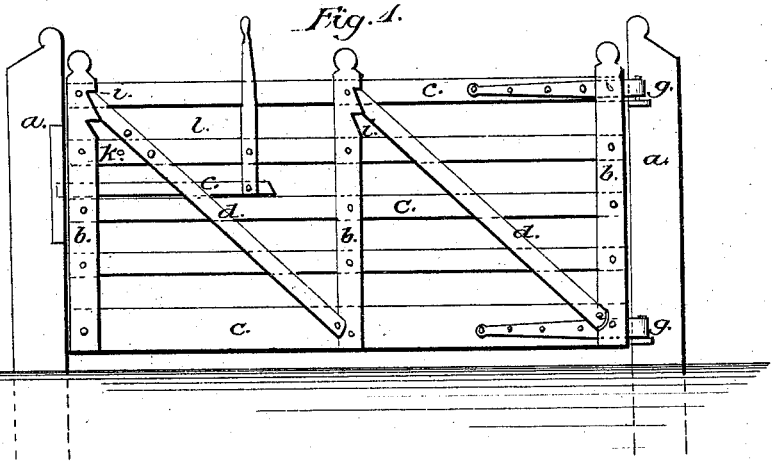

Figure 1 is a representation of a double-panel gate, and

Figure 2:
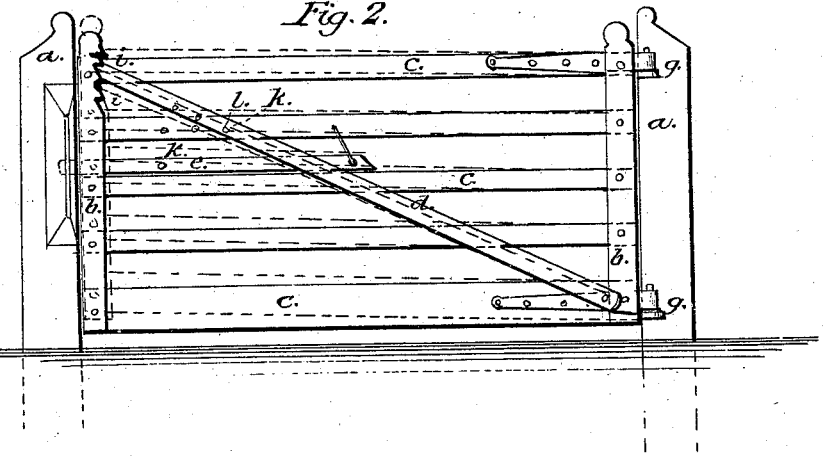

Figure 2, a single-panel gate, to both of which my improvement is applied.

Like letters of reference indicate like parts in the two figures.

$a$ represents the posts between which the gate is supported;

$b$, the vertical parts or stiles of the gate;

$c$, the horizontal bars;

$d$, the diagonal brace;

$e$, the latch or fastening; and $g$, the hinges.

In framing the gate, the stiles are either mortised to receive the ends of the bars, or the stiles may be made in two parts, between which the bars may be held. In either case, the ends of the bars are to be secured by a single bolt or pin, or in some other manner which will leave them with freedom to rotate a short distance vertically.

The diagonal brace $d$ is pivoted or stepped in a suitable manner, at the lower end of the inner stile, as at $h$, and its opposite end is adapted to notches $i$, near the upper end of the outer stile.

$k$ represents holes through the horizontal bars, and corresponding with the different positions of the diagonal brace, similar holes, through which a pin, or bolt, $l$, may be inserted, to retain the parts in the position in which they may be placed.

The operation of this contrivance will be readily understood.

By raising the outer end of the gate, the diagonal brace is allowed to fall into either of the notches provided for it, where it may be secured by a bolt, or pin, $e$, passing through the appropriate holes, $k$; and in this position, more or less elevated above the ground over which it is to rotate, it will be firmly supported.

I am aware that a pivoted bar, taking into a notched batten of the gate, is not new; nor do I wish to broadly claim the same, as it is shown in the patent of E. P. H. Capron, April 28, 1868. In his gate, however, he employs two pivoted bars, secured together by a brace, which is provided with a hole, registering with holes in a middle batten, and provided with a pin to affect adjustment. In my gate, I dispense with the use of two bars and the connecting-brace, using only one, and applying the adjusting-pin directly to the bar, and taking into one of the rails of the gate; and herein consists one feature of my invention.

What I claim, is—

1. The pivoted bar, with adjusting-pin, arranged and combined as set forth.

2. In combination with the above, the swinging latch, as specified.

JACOB TANNER.

Witnesses:
L. C. CONNER,
JAMES H. WILSON.